H. CROSS.
SHOCK ABSORBER.
APPLICATION FILED OCT. 2, 1919.
1,326,850.
Patented Dec. 30, 1919.
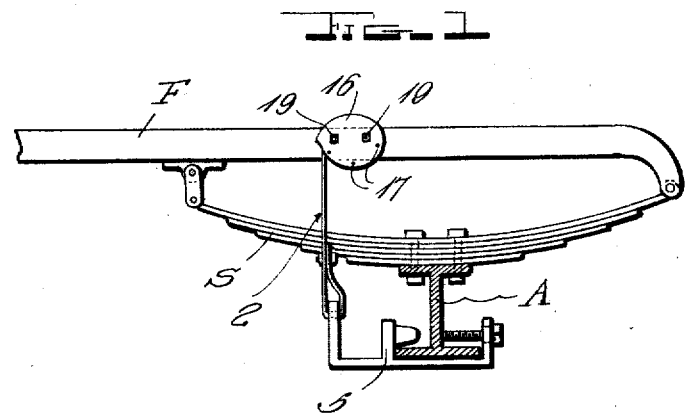
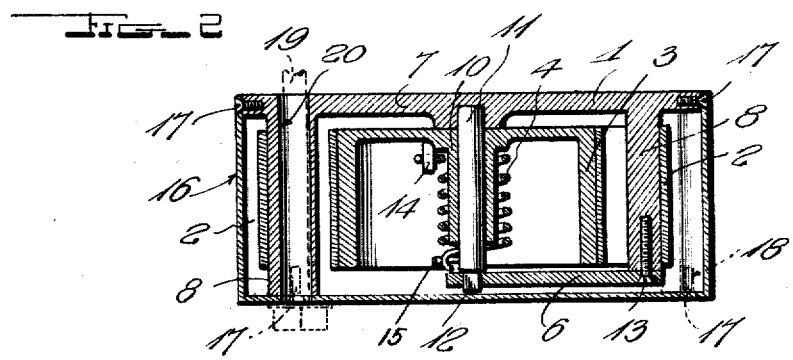
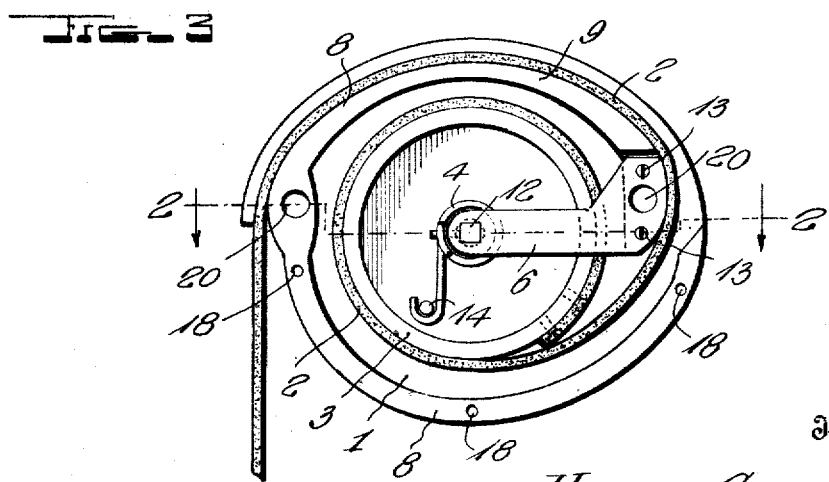
Witness
Inventor
Harry Cross
By H. B. Willson & Co.
Attorneys

UNITED STATES PATENT OFFICE.

HARRY CROSS, OF MONTREAL, QUEBEC, CANADA.

SHOCK-ABSORBER.

1,326,850.   Specification of Letters Patent.   Patented Dec. 30, 1919.

Application filed October 2, 1919. Serial No. 327,877.

*To all whom it may concern:*

Be it known that I, HARRY CROSS, a citizen of the United States, residing at Montreal, in the Province of Quebec and Dominion of Canada, have invented certain new and useful Improvements in Shock-Absorbers; and I do declare the following to be a full, clear, and exact description of the invention, such as will enable others skilled in the art to which it appertains to make and use the same.

This invention relates to shock absorbers and it is particularly designed to be used in connection with automobiles, although it is not to be restricted to such use.

The primary object of the invention is to provide an improved shock absorber, having means for controlling the movement or vibrations of the spring-supported body of a vehicle relative to the running gear of the same, which does not effect the action of the vehicle springs in compressing, but prevents, as much as possible, the rebound or upward movement of the body of the vehicle which is extremely uncomfortable to the occupants of the vehicle, and is severe on the springs, oftentimes causing them to become broken.

Another object of the invention is to provide a device of the above mentioned character which is simple in construction, effective in operation, strong, durable and inexpensive to manufacture.

Other objects and advantages of the invention will be apparent during the course of the following description.

In the accompanying drawings forming a part of this specification and in which like numerals are employed to designate like parts throughout the same, Figure 1 is a side elevation illustrating the manner of attaching my improved shock absorber to a spring-supported vehicle.

Fig. 2 is a horizontal section on the plane of line 2—2 of Fig. 3.

Fig. 3 is an enlarged side elevation of the device constructed in accordance with my invention.

In the drawings, wherein for the purpose of illustration is shown a preferred embodiment of the invention, F indicates a portion of the automobile frame which is carried on the usual springs S and axle A and with which my improved shock absorbing device is associated.

In carrying out my invention I employ a casing or housing 1 which is provided with a friction track over which a belt or strap 2 is adapted to slide. One end of the belt 2 is secured to a drum 3 which is mounted for rotation within the casing 1 and is adapted to wind or cause the belt to be wound thereon. Such action of the drum 3 is caused by a coiled spring 4 which is arranged in a novel manner in the casing. The other end of the band 2 is connected to a clamping member or bracket 5 carried by the axle A. I also employ novel means 6 to adjust the tension of the spring 4.

The casing or housing 1 is preferably semi-oval-shaped in configuration and includes a plate 7 which has a flange 8 extending outwardly therefrom. A portion of this flange forms a friction track 9 over which the belt 2 slides. Cast integral with drum 3 and extending in the same direction as the flange 8 is a centrally disposed sleeve or hub 10 around which the spring 4 is disposed. This hub serves to prevent, as much as possible, wiggling or side motion of the drum as would otherwise occur.

In order to adjust the tension of the spring 4, I employ spring tightening arm 6 which is carried by a pin 11 loosely fitted in the hub 10. Although the pin 11 may be of any other construction I preferably make it cylindrical and extend one end of it beyond the end of the sleeve 10 in which it revolves. The inner end of the spring tightening arm 6 is provided with a square aperture, as shown which fits over the reduced square end 12 of the pin 11 and permits the pin to be rotated in the sleeve 10 when the member 6 is moved in a rotary direction. The opposite or outer end of the arm 6 is detachably secured to the friction flange 7 by means of screws 13. The spring 4 has one of its ends hooked or anchored around a pin 14 projecting from the drum 3 and the other end is connected to a lateral projection or lug 15 carried by the pin 11. Hence, it will be seen that when the arm 6 is rotated from left to right the spring will be wound tighter, and it is in this manner that the tension of said spring is adjusted.

The free end of the belt 2 may be anchored in any suitable manner, such as for instance, by a clamping member or bracket 5 of a construction which may be readily attached to and detached from the axle A of the vehicle.

In order to prevent and guard against the entrance of mud and dirt into the aforesaid parts, I employ a cover 16 which is attached in position by means of screws 17 which fit in holes 18 drilled in the casing 1.

The whole device is secured to the frame F by means of bolts 19 which pass through the openings 20 in the cover 15 and casing 1 as shown.

When the car encounters an uneven place in the road the spring A and frame F will be brought closer together. When this occurs, the belt 2 will become slack and by the action of the coiled spring 4 on the drum 3 the belt will be caused to wind thereon. On the immediate rebound or separation of the spring from the frame, the belt will be placed under tension and a braking action exerted thereon, thereby preventing a quick or sudden rebound of the vehicle body. In other words, when the spring S and frame F separate the belt 2 is drawn over the friction track 9 and is also subjected to the action of the spring 4, thus resulting in retarding the movement of the belt and preventing the upward throw of the vehicle body which is objectionable to the occupants of the car and oftentimes injurious to the springs. It is not intended however, that this device interfere in any way with the compressing of the vehicle spring, it being only desired to prevent, as much as possible, the rebound of the vehicle body.

It is to be understood that the form of my invention herein shown and described is to be taken as a preferred embodiment of the same, and that various changes in the shape, size and arrangement of parts may be resorted to without departing from the spirit of the invention or the scope of the subjoined claims.

Having thus described my invention, what I claim is:—

1. In a shock absorber, a casing including a friction track, a sleeve in said casing, a drum in said casing, a coiled spring surrounding said sleeve, a pin loosely mounted in said sleeve, said pin having one of its ends projecting beyond said sleeve, a spring tightening arm carried by said extended portion of the pin, the outer end of said arm being detachably secured to the friction track, one end of said spring being anchored to the drum and the other end to the pin, whereby when the spring tightening arm is rotated the tension of the spring is adjusted, a belt secured to said drum, said belt being adapted to slide over the friction track, and means for anchoring the other end of said belt to the vehicle.

2. In a shock absorber, a casing including a friction track, a hub in said casing, a drum in said casing, a pin in said hub, a coiled spring surrounding said hub, an arm extending laterally from said pin and anchored in said casing, a belt secured at one of its ends to said drum, the opposite end thereof extending over the friction track in the casing, and means for anchoring the free end of the belt to an axle, substantially as set forth.

3. In a shock absorber, a semi-oval shaped casing including a plate having a flange extending outwardly therefrom, a portion of said flange serving as a friction track, a drum having a centrally disposed hub cast integral therewith, a spring anchoring pin in said drum adjacent the hub, a pin loosely mounted in said hub and extending beyond one end thereof, the extremity of said pin being reduced, a lug on the extended portion of said pin, a coiled spring surrounding said hub and pin, one end of said spring being secured to said anchoring pin in the drum, the opposite end being fastened to the lug on said pin, a spring tightening arm secured to the reduced extremity of said pin, the opposite end of said arm being detachably secured to said friction track, a belt having one of its ends secured to said drum, the opposite end being slidable over said friction track, and means to anchor the free end of said belt to a part of a vehicle.

In testimony whereof I have hereunto set my hand.

HARRY CROSS.